Patented June 5, 1934

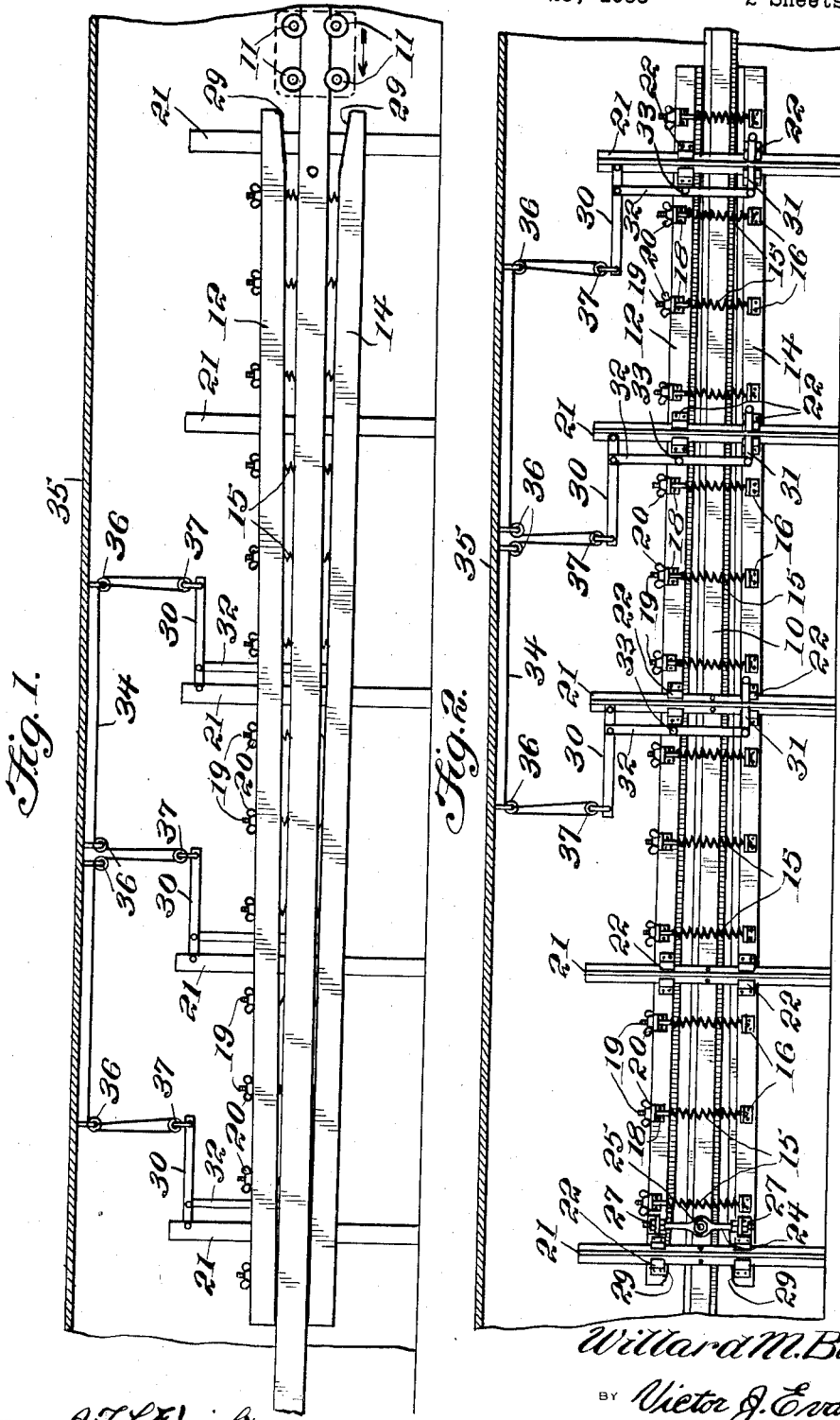

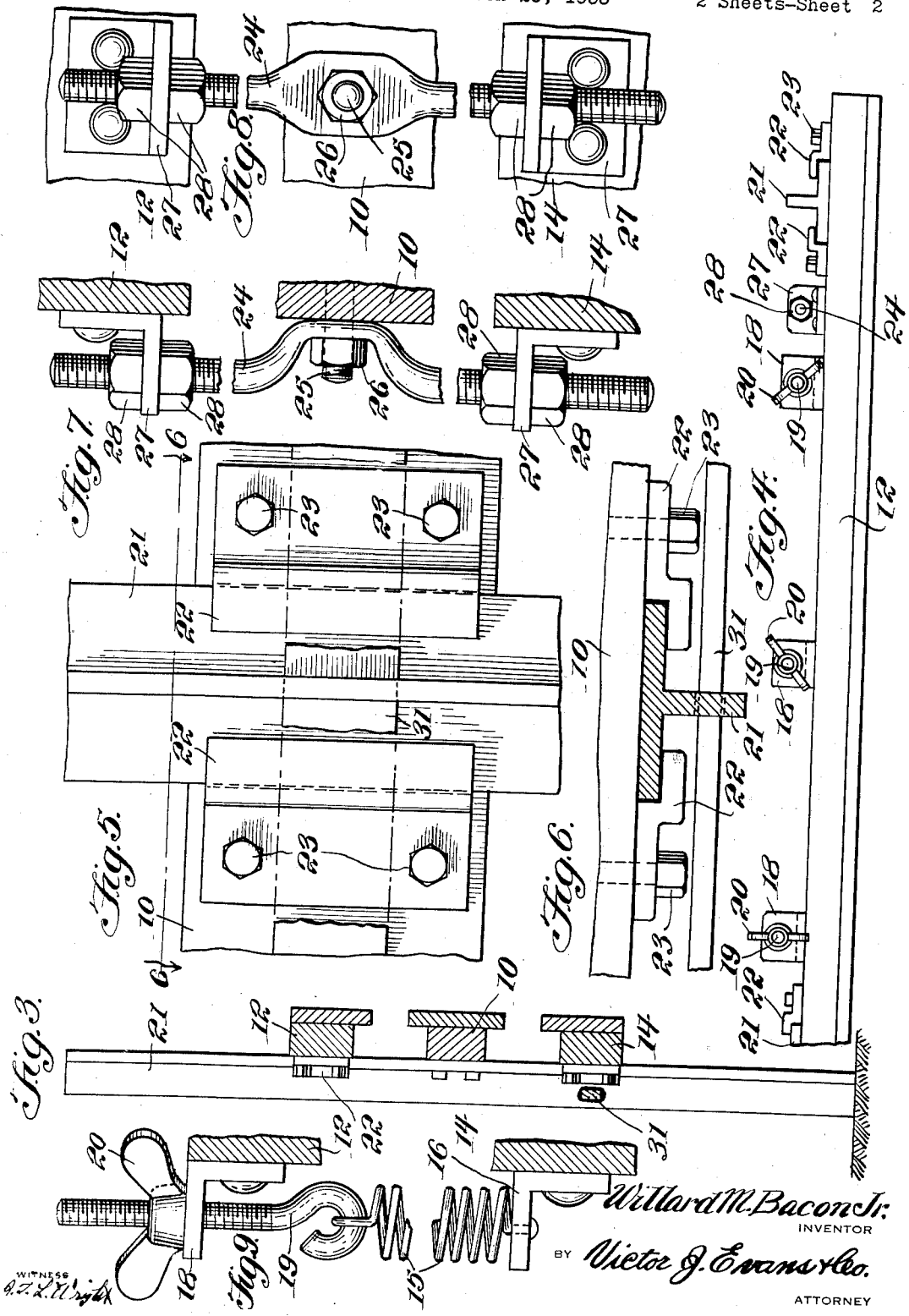

1,961,998

UNITED STATES PATENT OFFICE

1,961,998

BRAKE FOR MECHANICAL LURES

Willard M. Bacon, Jr., Tampa, Fla., assignor to
J. Homer Ellis, Hillsborough County, Fla., and
E. J. O'Hare, Dade County, Fla.

Application March 23, 1933, Serial No. 662,340

5 Claims. (Cl. 188—62)

The object of the invention is to provide a brake for use in combination with the track of a mechanical lure that will effectively arrest the movement of the carriage after it has acquired the increased speed imparted to it at the time that it is deflected into the housing conventionally employed to receive the lure at the end of a race; to provide a brake mechanism particularly adapted for use in connection with a suspended carriage in which the track is laterally of the carriage so that the brake may engage both the upper and lower wheels of the latter in bringing it to rest; to provide a brake mechanism which, while impelled to braking position with comparatively great force, is readily released by an attendant to permit the carriage to be readily moved in starting on its journey around the track; to provide a brake mechanism which is loosely suspended with relation to the track while at the same time being adjustable to secure the most effective positioning of the parts for the entrance therebetween of the carriage rollers; and generally to provide a brake mechanism of the kind indicated which is of simple form and susceptible of cheap manufacture and installation.

With this object in view, the invention consists in a construction and combination of parts of which a preferred embodiment is illustrated in the accompanying drawings but to which embodiment the invention is not to be restricted. Continued use in practice may dictate certain changes or alterations and the right is claimed to make any which fall within the scope of the annexed claims.

In the drawings:

Figure 1 is a front elevational view of the invention, the top wall of the housing being formed in section.

Figure 2 is a rear elevational view.

Figure 3 is a transverse sectional view of the track rail and brake bars in the plane of one of the supporting posts or standards.

Figure 4 is an enlarged detail plan view of a portion of the brake comprehended between standards.

Figure 5 is a detail elevational view of the sliding connection between the brake bars and the standards.

Figure 6 is a sectional view on the plane indicated by the line 6—6 of Figure 5.

Figure 7 is a side elevational view, partly in section, of the brake bar anchoring member.

Figure 8 is a front elevational view of the structure of Figure 7.

Figure 9 is a side elevational view, partly in section, of the brake bar actuating spring and the adjustment therefor.

Since it is customary in the racing of dogs to increase the speed of the lure carriage after the dogs have reached the finish line, so that it may be carried into the housing without difficulty, it becomes necessary to provide an effective braking mechanism for bringing the carriage to rest if difficulties are not to be encountered. In the present invention, the braking mechanism, while adapted for use in any construction where the carriage rollers or wheels may be engaged by the braking mechanism, is particularly adapted for use with the laterally supported carriage traversing a track in the form of a cross-sectionally T-shaped rail 10 and suspended from said track by means of grooved rollers 11 which are so disposed as to straddle the upper and lower edges of the rail flange. In the housing, where the movement of the carriage is arrested, the brake mechanism is disposed and comprises the complemental brake bars 12 and 14 disposed in the same vertical plane as the flange of the rail 10 but respectively above and below the rail. The bars 12 and 14 are yieldingly impelled towards each other by means of springs 15 mounted at fixed points throughout the length of the bars, both bars being provided with bracket lugs of which the lugs 16 of the bars 14 have the springs 17 anchored thereto, while the lugs 18 of the bar 12 are formed with eyes for the passage of the threaded shanks of the hook bolts 19 with which the opposite ends of the springs are connected. The wing nuts 20 attached to the threaded shanks of the hook bolts constitute adjusting means for the latter and consequently provide for an increased or diminished pull on the springs depending on the adjustment of the bolts.

The rail 10 is supported the desired distance above the ground by reason of being mounted upon and carried by cross-sectionally T-shaped standards or posts 21 and the brake bars are slidably supported in the same vertical plane as the rail by reason of the cleats 22 with which they are equipped, these cleats being secured to the bars by cap screws 23 and the cleats being offset, as shown, to permit the bars lying flat against the cross flanges of the standards.

At that end of the brake mechanism that is first engaged by the rollers of the carriage, the spacing of the bars 12 and 14 is fixed, by reason of a double-ended bolt member 24 which is flattened at its longitudinal center and offset thereat to be secured to the rail 10 by means of a stud 25 fixed in the latter and passing through the flattened portion to receive a nut 26. The extremities of the double-ended bolt pass through perforations in the ears of bracket lugs 27 by which the bars are loosely enough supported for movement towards and from each other, the bolt member receiving the nuts 28 bearing respectively on opposite sides of the ears of the bracket lugs.

The facing edges of the brake bars at the point of entrance of the carriage rollers between them are tapered off as indicated at 29, so that the rollers may pass between the brake bars when the edges of the latter facing the rail will bear on the peripheries of the rollers at points diametrically opposite the points of engagement of the rollers with the rail. The spacing of the brake bars being fixed only at the point of entrance of the carriage rollers between them, the remote ends are yieldingly impelled towards each other, so that the brake bars are normally in convergent relation and are spread to parallel position by the carriage rollers. The comparatively great length of the brake bars makes for a comparatively long run of the carriage under the resistance interposed by the engagement of the rollers with the bars and thus there is provided sufficient resistance to stop the carriage even under conditions of exceptional impetus of the latter.

The brake bars are effective in arresting the movement of the carriage and it is necessary that means be provided for readily releasing them when the carriage is to be again started. Such means comprises either one, or a plurality of compound levers, a plurality of levers being preferable, as shown in the drawings. Each compound lever comprises a lever 30 of the second order and a lever 31 of the first order, the lever 30 being pivotally connected with a standard 21 above the brake bar 12 and the lever 31 being rockingly mounted in an opening in the leg flange of the standard 21 substantially in the horizontal plane of the brake bar 14. The lever 31 has a pivotal connection with the bar 14 and with a link 32, which latter is connected at an intermediate point, as at 33, with the bar 12 and has a terminal pivotal connection with the lever 30. Spreading movement of the brake bars is effected by raising the lever 30, when a pull is created on the link 32, thus elevating the bar 12 and the force arm of the lever 31, thus depressing the resistance arm of the latter lever and forcing the brake bar 14 downwardly. The two brake bars are thus moved in opposite directions away from each other, so that they are freed of the carriage rollers and the latter are permitted to pass from between them. The levers 30 of all of the compound levers are connected for synchronous actuation through the instrumentality of a pull cord 34 terminally anchored at some fixed points, preferably points on the roof or ceiling 35 of the housing, as, for example, the mountings of direction pulleys 36 over which it is trained, as well as over direction pulleys 37 carried at the extremities of the force arms of the levers 30. A pull on the cord 34 between any two adjacent levers will thus effect elevation of the force arms of all of the levers with their consequent spreading action on the brake bars.

The invention having been described, what is claimed as new and useful is:

1. The combination with the track of a mechanical lure in which the carriage is suspended laterally therefrom, brake bars positioned respectively above and below the track and arranged in slightly converging positions towards the track, and springs yieldingly impelling the brake bars towards each other and towards the track.

2. In combination with the track of a mechanical lure, brake bars disposed on opposite sides of the track, a member connecting the brake bars adjacent one end, and springs yieldingly impelling the remaining ends of the brake bars towards each other, so that they are normally disposed in slightly converging positions towards each other and towards the track, said member having adjustable connections with the brake bars to vary the spacing of the latter where it is connected with the same.

3. In combination with the track of a mechanical lure, brake bars disposed on opposite sides of the track, a member connecting the brake bars adjacent one end, and springs yieldingly impelling the remaining ends of the brake bars towards each other, so that they are normally disposed in slightly converging positions towards each other and towards the track, said member being connected at an intermediate point with the track.

4. In combination with the track of a mechanical lure, brake bars disposed on opposite sides of the track, a member connecting the brake bars adjacent one end, and springs yieldingly impelling the remaining ends of the brake bars towards each other, so that they are normally disposed in slightly converging positions towards each other and towards the track, said member being connected at an intermediate point with the track and having adjustable connections with the brake bars to vary the spacing between the latter at the point where it is connected with the same.

5. In combination with the track of a mechanical lure, brake bars disposed on opposite sides of the track in slightly converging positions with respect to each other and to the track, springs yieldingly impelling the brake bars towards each other and uniformly spaced along the latter whereby the track engaging rollers of a lure carriage will be engaged and the movement of the carriage arrested, and manual means for separating the bars in opposition to the spring, the latter consisting of a plurality of sets of compound levers operatively connected with the bars to move the same with respect to each other and to the track and manual means for simultaneously actuating the levers and consisting of suspended pulleys and a terminally anchored pull cord trained over said pulleys and having a running engagement with the force arms of said levers.

WILLARD M. BACON, Jr.